United States Patent

[11] 3,613,882

| [72] | Inventor | Henry M. Stampe<br>9091 Gale, Pontiac, Mich. 48054 |
|---|---|---|
| [21] | Appl. No. | 21,059 |
| [22] | Filed | Mar. 19, 1970 |
| [45] | Patented | Oct. 19, 1971 |

| [54] | NUT-SORTING MACHINE<br>15 Claims, 4 Drawing Figs. | |
|---|---|---|
| [52] | U.S. Cl. | 209/73,<br>209/90, 209/109 |
| [51] | Int. Cl. | B07c 5/06 |
| [50] | Field of Search | 209/109,<br>90, 73, 82 |

[56] References Cited
UNITED STATES PATENTS

| 2,111,252 | 3/1938 | Summers | 209/82 |
| 3,024,903 | 3/1962 | Jamal | 209/109 X |

*Primary Examiner*—Allen N. Knowles
*Attorney*—Benjamin W. Colman

ABSTRACT: This invention relates to an improved nut fastener sorting machine having a feed wheel for supplying the fasteners to a complementary spoke wheel having plug gage-type spoke members upon which the nuts are dropped one at a time from the feed wheel and from which they are removed by a split member stripper and discharged selectively into containers according to their respective positions upon the spoke members.

INVENTOR.
HENRY M. STAMPE
BY
ATTORNEY

INVENTOR.
HENRY M. STAMPE

INVENTOR.
HENRY M. STAMPE
BY Benjamin W Calman
ATTORNEY

NUT-SORTING MACHINE

The invention involves a machine frame upon which is rotatably mounted, in synchronized relationship, a nut-feeding wheel and a nut-receiving spoke wheel therebelow, the spoke wheel rotating in a chamber having nut stripping and discharging plates or members to automatically and selectively remove the nuts from the spoke members. The nuts, when removed, slide and drop into collecting containers arranged on the floor below the respective machine selecting positions, according to the dimensional bore condition of the nut, which determines its relative position upon the plug gage spoke members of the spoke wheel. The feed wheel and spoke wheel of the machine are keyed to their drive shafts in timed relationship and motor-driven in synchronization by keyed gears and a speed reduction drive mechanism mounted upon the framing of the machine.

Heretofore, one of the principal costs in the production of nut-type fasteners has been the manual and visual inspection and sorting of dimensionally defective nuts from the large volume automatic-machine production of such fasteners. Threaded female fasteners such as nuts, are normally made on high volume, high-speed automatic cold-heading machines. Production is often at the rate of several thousand pieces per hour. At the present time, in order to select from such high volume production those nuts which contain bore dimensional defects including failure to tap or thread the bore of the nut, severely deformed threads resulting from any number of manufacturing problems, or for any other reason wherein the threaded bore is unduly or unusually misshapen or is of improper dimensional character, manual and personal inspection is required and its cost constitutes a substantial part of the cost of production. In addition, personal inspection is not always reliable, particularly as required for an by the large volume users of nuts such as manufacturers for and in the automotive industry. As a further consideration, very high quality control for fasteners constitutes a major requirement and demand by customers utilizing nut fasteners in machines with which human operators are associated. Under such conditions, it is most desirable and necessary that the highest quality control over these large volume production fasteners be achieved. The instant invention was designed and generated for the purpose of serving such need. It is therefore an object of the invention to provide a nut fastener sorting machine having split stripper means for selectively removing nuts from a plug gage-type spoke wheel. Another object is to provide quality selection means whereby more than one type of threaded bore defect can be selectively sorted by the machine. Still another object is to provide means for selectively separating nuts have acceptable specification meeting threaded bores from nuts which do not have such specified threaded bores. Yet a further object of the invention is to provide an improved nut fastener sorting machine which is relatively simple in operation and construction and which meets the need for high quality control in high volume production systems.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a front elevational view, partially in section, of a machine embodying the inventive concept.

Figure 1:
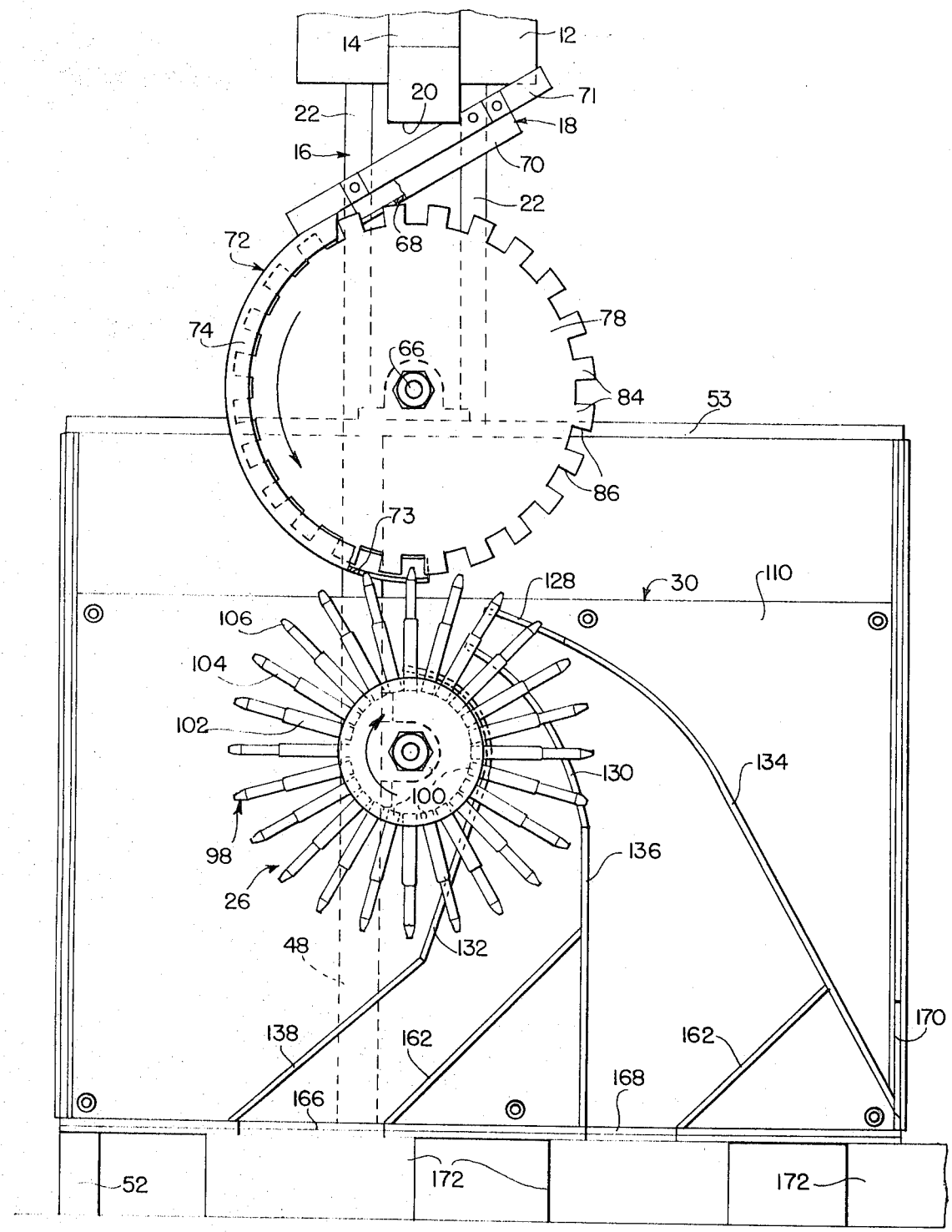

The description given below is a disclosure of an exemplary preferred embodiment of the invention, and it is to be understood that such description does not limit the scope of application of the invention.

As shown in the drawings, the nut fastener sorting machine 10, particularly designed for female-type threaded fasteners having an internally threaded bore, comprises a reservoir 12, for a collected group of such fasteners, having a discharge chute 14 supported on framing generally designed by the reference numeral 16, a slide 18 disposed in nut-receiving position below the discharge end 20 of chute 14, the slide being secured to the framing side member 22 in any suitable manner as by welding or fasteners, a gear-driven feed wheel device 24, a gear-driven spoke wheel device 26, a motor drive and speed reducing mechanism 28, and the nut stripper and discharge portion 30.

Figure 2:
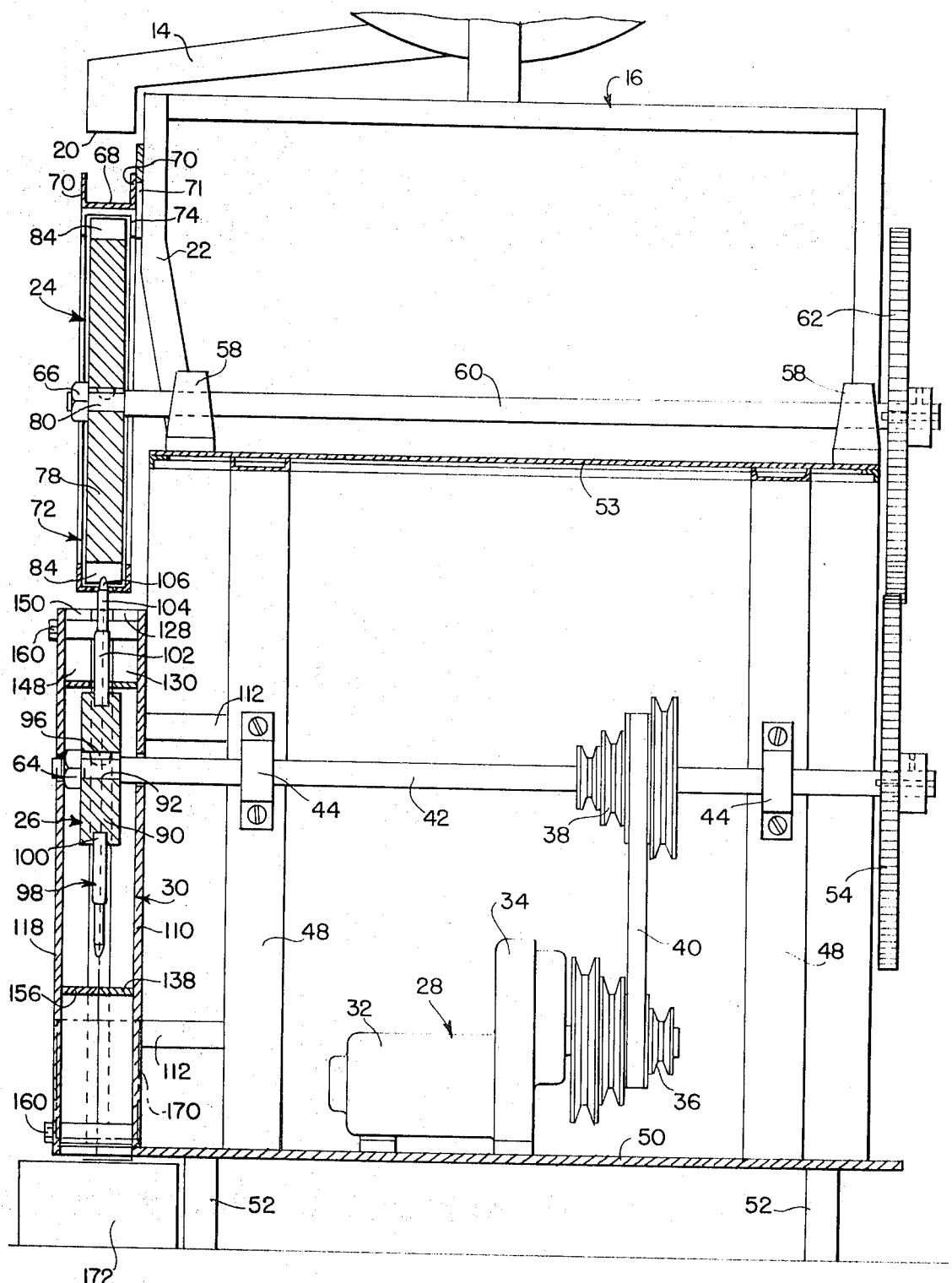
FIG. 2 is a side elevational view, partially in section, at right angles to the view shown in FIG. 1, and taken from the right in FIG. 1.

As seen particularly in FIGS. 1 and 2 of the drawings, the motor drive and speed-reducing mechanism 28 comprises a motor drive 32 having a speed reducer portion 34 provided with an output shaft supporting a stepdown pulley set 36 connected to a complementary pulley set 38 by a drive belt 40, the pulley set 38 being secured for rotation upon a driven shaft 42 rotatably mounted in pillow blocks 44,44 secured to supporting framing members 48,48 which are affixed to and mounted upon a baseplate 50 and extend upwardly to the upper table plate 53 where their upper ends are suitably affixed and secured. The baseplate 50 is in turn supported by base members 52,52 extending the length of the baseplate. Alternatively, the base members may be in the form of suitable legs.

A drive gear 54 is keyed to and secured for rotation at one end of driven shaft 42. At the other end of shaft 42 and disposed for rotation within the stripper and discharge device 30 is the spoke wheel device 26 which is also keyed to the shaft.

Secured to and upon the upper table plate 46 are the pillow blocks 58,58 for rotatably supporting the driven shaft 60, at one end of which driven gear 62, matched with drive gear 54, is key mounted and secured thereto for rotation. The feed wheel device 24 is also key mounted and secured to the shaft 60 at its other end, and in alignment with the spoke wheel 26. The spoke wheel 26 device is fixedly secured to the outboard end of shaft 46 in any conventional manner, as by the nut 64. Similarly, the feed wheel device 24 is fixedly secured to the outboard end of shaft 60 in any suitable manner, as by the nut 66. It will be noted, and as shown in FIG. 2, that the discharge end 20 of chute 14, the slide 18, the feed wheel 24, the spoke wheel 26, and the stripper and discharge device 30 are all arranged in alignment one below the other.

Slide 18 comprises generally a channel member having a web portion 68 and a pair of upstanding lateral legs 70,70, one of which is secured to plate member 71 affixed to the framing side member 22. Spaced from the end of slide web 68 and secured to plate member 71 and to the member 22 is the semicircularly formed guide channel 72 having a web portion 73 closely overlying the feed wheel 24 and a pair of depending lateral legs 74,74 disposed closely adjacent the perimetric side edges of the feed wheel for retaining the nuts in the feed wheel device as the latter revolves and the nuts travel toward the spoke wheel device 26. The channel slide 18 is arranged so that nuts coming from the chute discharge end 20 will drop upon the web 68 and slidingly move by gravity thereon down toward the feed wheel 24. The nuts are normally discharged onto the slide web 68 with their bores normal to the plane of the web.

The feed wheel 24 basically comprises a center hub or core 78 arranged with a key slot bore to receive the keyed outboard end 80 of shaft 60. Disposed radially at the periphery of the core 78, and in equally spaced-apart increments, are a plurality of projecting spacer members or lugs 84 forming intermediate slots, pockets or open spaces 86 therebetween for receiving nuts discharged from the end of slide 18. The open spaces 86 intermediate the spaces 84 are of a dimension such that nuts received from the slide 18 will be substantially fully seated in the spaces 86 for rotational travel in the feed wheel 24 under the overlying web portion 73 of the guide channel 72.

The spoke wheel 26 comprises a hub or core member 90 having a bore 92 therethrough adapted to receive and be removably secured to the distal end portion 94 of driven shaft 42 by a key 96, or by any other suitable means, and a plurality of plug gage-type spoke members 98 suitably secured to the hub 90 and projecting radially therefrom at its periphery in a number equal to and for registration with the open nut-receiving spaces 86 provided in the feed wheel 24. The spoke members 98 comprise a first or base portion 100 which is adapted to be either removably or fixedly secured in the hub member 90, a second portion 102 having a diameter dimension such that a nut having an oversized bore (whether threaded or not), or on the selected high tolerance limit thereof, will be carried on such portion, a next portion 104 of smaller diameter dimension to receive a threaded nut which has the proper or within selected tolerance bore diameter, and a distal end portion 106 to receive and support thereon a nut having an undersize threaded or unthreaded bore. Thus, each plug gage-type spoke member 98 is designed to carry at different positions thereon, a nut having an oversize or high-side threaded bore, a nut of specified within tolerance bore dimension, and an undersize or unthreaded bore nut. Such positioning of nuts received from the feed wheel 24 permits their selective removal from each of the respective portions of the spoke members 98 by the stripper and discharge device 30. It will, of course, be understood by persons skilled in the art to which the invention pertains that parts or bodies having precision bores therein other than threaded female fasteners, which can be received on and carried by the disclosed plug gage-type spoke members, may also be sorted by a machine embodying this invention.

Figure 3:
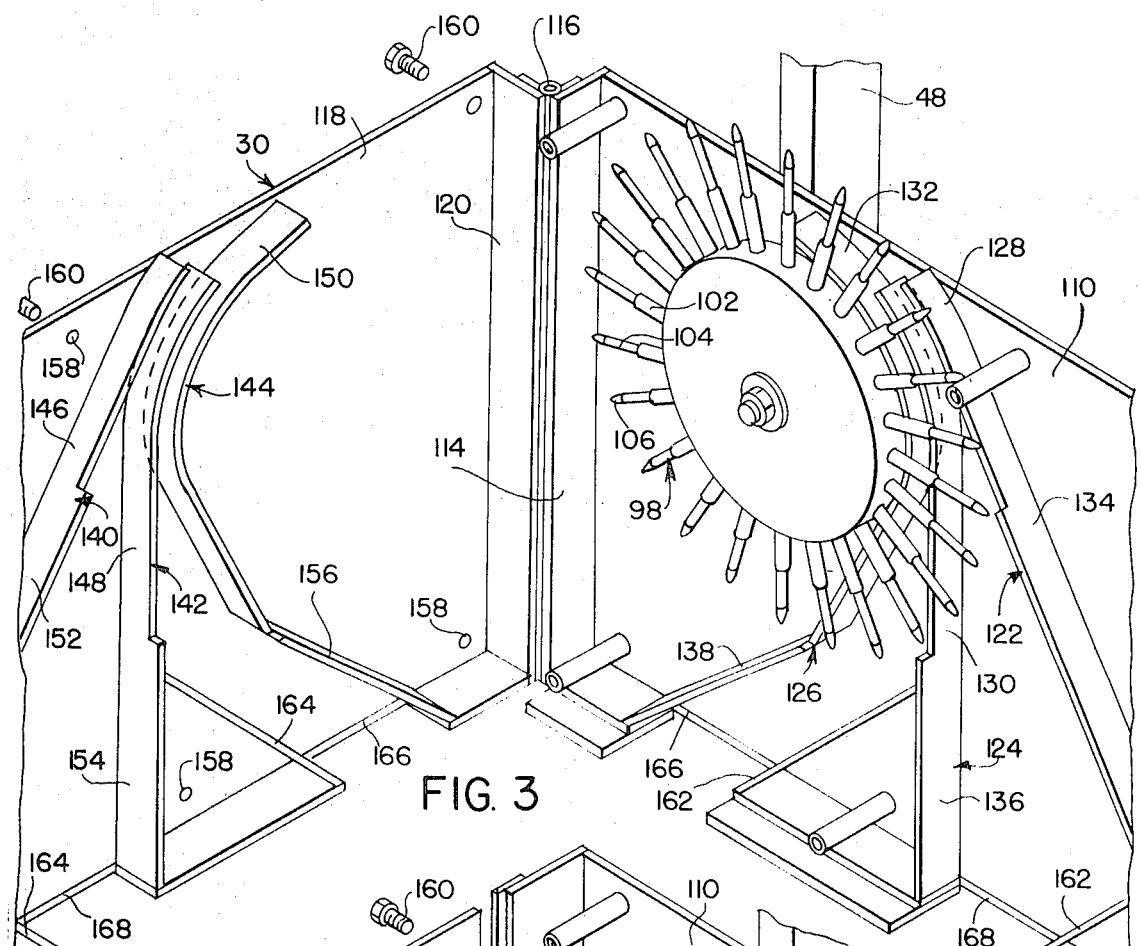
FIG. 3 is an expanded perspective view of the stripper and discharge portion of the machine.

As shown more clearly in FIG. 3, the stripper and discharge portion 30 comprises a first inner support wall 110 fixedly secured to the framing members 48 by the support bars 112 and having a flange 114 at one end supporting a hinge 116 to which is secured the second outer support wall 118 by its flange 120. Fixedly secured to the inner support wall 110 are a plurality of stripper and discharge elements 122, 124 and 126, corresponding in number to the portions 102, 104 and 106 on the spoke members 98.

The elements 122, 124 and 126 comprise upper stripper portions 128, 130 and 132 respectively and lower discharge portions 134, 136 and 138 respectively. These upper portions extend laterally outwardly to a line closely adjacent but spaced slightly from the spoke members 98 within their circle of revolution, and the lower portions extend to a line intermediate and substantially central of the space between the inner and outer support walls 110 and 118.

The outer support wall 118 is also provided with similarly affixed stripper and discharge elements, these being numbered 140, 142 and 144 with stripper portions 146, 148 and 150 and discharge portions 152, 154 and 156 respectively. The respective complementary stripper and discharge portions of each support wall are arranged to come into alignment about each side of the spoke members 98, and to abut each other therebelow, as shown more clearly in FIG. 2.

Bolt openings 158 are provided in the inner and outer support walls 110 and 118 through which bolts 160 can be passed to secure the two walls in spaced relationship so that the stripper and discharge elements can perform their specified functions during operation of the machine. The connecting hinge 116 is not essential. Without it, the outer support wall 118 can be manually removed after bolts 160 have been withdrawn from holes 158 in the two support walls.

Figure 4:
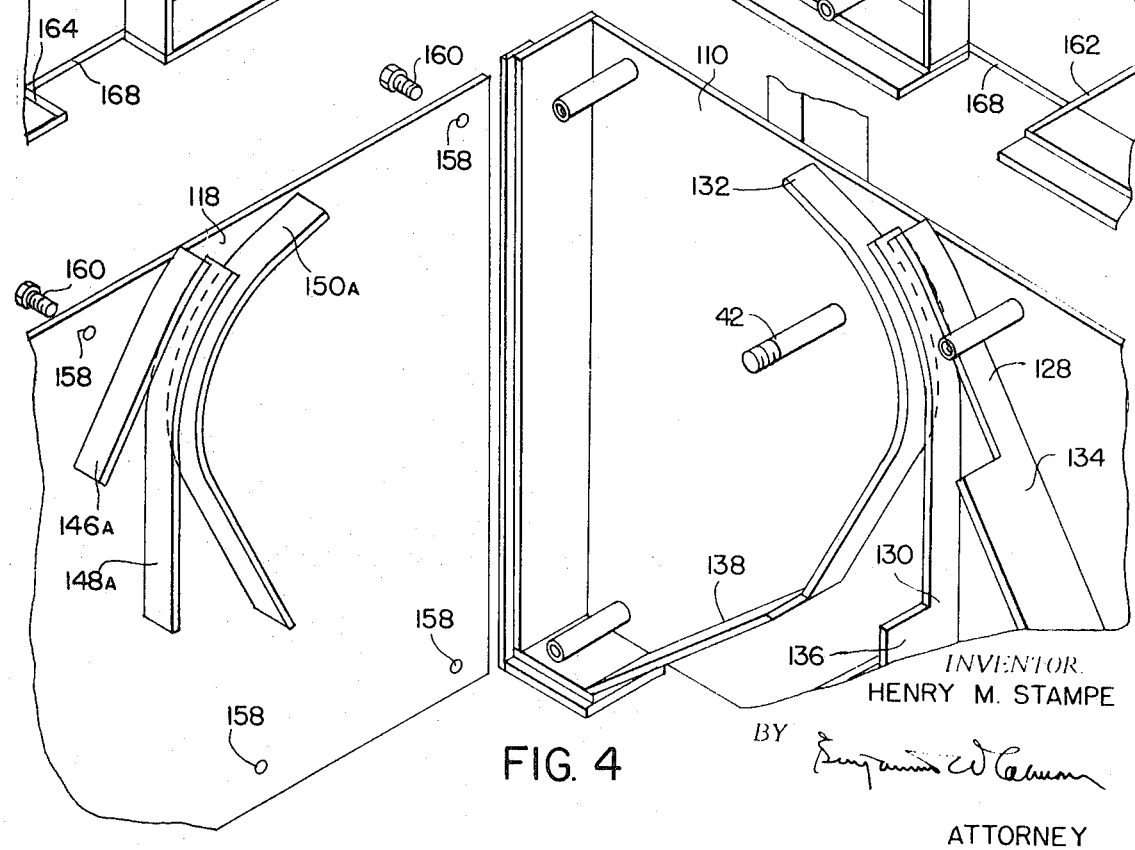
FIG. 4 is a fragmentary view similar to that illustrated in FIG. 3, but showing a slight modification of the stripper and discharge portion.

A slight modification of the structure described above and shown in FIG. 3 is illustrated in FIG. 4, wherein the stripper and discharge elements 122, 124 and 126 are modified to the extent that their discharge portions 134, 136 and 138 secured to the inner wall 110 are wider and extend outwardly to the outer support wall 118, which mounts only the stripper portions 146a, 148a and 150a.

Complementary aligned slide or baffle members 162, 164 are secured to the support plate 110 and 118 respectively for directing the nut fasteners stripped and discharged from the spoke members 98 into and through openings 166, 168 and 170 to the collecting pans 172 disposed therebelow on the floor of the shop.

In setting the machine 10 up for operation, the spoke wheel 26 is selected with spoke members 98 having the particular diametric portions 102, 104 and 106 required for sorting nut fasteners having oversize or high tolerance bore dimensions, within preferred tolerance bore dimensions, and undersize or low tolerance bore dimensions, respectively, for each size nut to be sorted. After key mounting the selected spoke wheel 26 on the shaft end portion 94 and securing it thereon with nut 64, the outer support wall 118 is secured in place and spaced relationship to the inner support wall 110 by bolts 160. The open spaces or pockets 86 in feed wheel 24 are aligned for registration with the spoke members 98 of the spoke wheel 26, as above described, and the two devices are so arranged and timed on their respective shafts 60 and 42 that the distal ends 106 of the spoke members 98 come into nut-receiving position with the pockets 86 of the feed wheel when the nuts slide or fall from its pockets.

The output speed of drive gear 54 is established by the speed of rotation imparted thereto by the stepdown pulleys 36 and 38 and the motor drive speed reducer device 28. Such output speed is normally related to the size and character of the nuts to be sorted, i.e., the larger the nut the slower the speed, although a desired or required production rate may well be a prime or controlling factor.

In operation, the nuts delivered by the reservoir 12 through chute 14 to slide 18 will be fed in discharge sequence to the feed wheel 24 by dropping them from the slide into the open spaces 86 between the spacer members of the feed wheel. The upper end of the overlying channel web 73 restricts discharge of the nuts from the slide web 68 except as permitted by their acceptance in open pockets 86 of the feed wheel.

As the feed wheel 24 rotates, the nuts positioned therein come into dropoff attitude on the lower side of the wheel, being carried by the channel web 73, and fall therefrom onto the spoke members 98 of the spoke wheel 26 (FIG. 2). Depending upon the dimensional bore condition of the nuts, each will fall onto one of the portions 102, 104 or 106, depending upon an oversize or high limit condition, a within tolerance specification condition, or a low limit or undersize condition, respectively. The spoke wheel carries the nuts upon the spoke members 98 toward the stripper and discharge members 122, 124 and 126 of wall 110 and their complementary aligned members 140, 142 and 144, mounted on the adjacent support wall 118. The nuts impaled on the distal end portions 106 will become engaged by and slide upon the upper takeoff surface of the stripper elements 128 and 146, and as the spoke wheel rotates such nuts will be lifted from such portion 106 and slide down the discharge portions 134 and 152 through the opening 170 and into a receiving collecting container 172. If the nut is of within tolerance bore specifications or dimensions and rests upon the portion 104 of the spoke member 98, it will become engaged by and slide upon the upper surface of the stripper elements 130 and 148 and, upon release from the spoke member 98, slide toward the opening 168 for discharge to its collecting container 172. Should the threaded bore of the nut be oversize or on the high tolerance limit, and thus disposed upon the portion 102 of the plug gage-type spoke members 98, it will become engaged by and slide upon the upper surface of the stripper elements 132 and 150 as the spoke wheel rotates, and, after removal from the spoke member 98, drop toward the baffle or slide plate 164 therebelow and through opening 166 to the collecting container 172.

The base end portions 100 of the spoke members 98 may be arranged for a press fit into the hub 90 for fixed securement, as shown, but such base end portions 100 may alternatively be threaded for removable engagement with threaded bores in the hub, or may be secured in such hub by any other suitable means, such as for example by locking setscrews, etc. The spoke members 98 are preferably arranged with two or more selected diameters to achieve the sorting function here described. Conceivably, more than the illustrated three-step portions can be provided in such members to sort nut fasteners into a desired number of selected catagories.

In the event that a nut should drop from the slide 18 into a feed wheel space 86 so that its bore axis is not radially disposed, but the nut instead is on its side, the spoke member tip 106 will engage such side, jamming the nut in the pocket 86, and the machine will stop. Suitable automatic power shutoff means can be provided in the power line serving the motor drive 32. The jammed nut is then manually removed after rotating the spoke member away therefrom, and the motor drive restarted.

The several portions of the machine 10 described above are preferably made of steel, although various portions may be made of other suitable metallic or plastic materials. Where appropriate, the various framing elements and base members of the machine are preferably secured together by welding, although other fastening means may also be used. The stripper and discharge elements of the portion 30 are preferably secured by welding to the walls 110 and 118.

Of course, alternatively, the stripper and extended discharge portions shown at the right in FIG. 4 and secured to the inner support wall 110 can be appended to the outer support wall 118 instead, should there be any significant advantage in so doing. One such advantage could well be the enlarged clearance provided below the spoke wheel 26, making it easier to insert and remove the same as changes are required for different bore size nuts.

Threaded bore female nut fasteners of the standard type can be checked for the internal minor thread diameter by the machine of this invention, for it is the minor thread diameter that comes to rest upon one of the portions of the spoke members 98. But the application and utility of the machine is not limited to checking the threaded bores of standard-type nuts. It is also particularly useful in determining the minor diameter of distorted threads of prevailing torque lock nuts, wherein the crown or the body of such nuts is deformed in order to deform the thread portions radially inwardly of the applied nut crown or nut body impactions. These thread deformations have a direct relationship to the locking torque of such lock nuts, and thus the machine of this invention can be used to selectively sort lock nuts according to their locking torque values or characteristics by suitably modifying and relating the diameters of the spoke member portions upon which these lock nuts will be impaled.

Although a certain particular embodiment of the invention is herein disclosed for purposes of explanation, further modifications thereof, after study of this specification, may well become apparent to those skilled in the art to which the invention pertains. Reference should be had to the appended claims in determining the scope of the invention.

I claim:

1. In a machine for selectively sorting female nut fasteners according to the dimensional state or the condition of their bores, the combination comprises
   a framing structure,
   a feed wheel device having a plurality of spaced slots for receiving such fasteners therein on a unit basis and for discharging said fasteners therefrom, rotatably mounted on said framing structure,
   fastener supply means mounted on said framing structure for serving said fasteners in an orderly sequence to said feed wheel device,
   a spoke wheel device rotatably mounted on said framing structure, in alignment with said feed wheel device and therebelow, having a plurality of radially disposed spoke members adapted to receive said fasteners from said pockets upon said spoke members in a one-to-one ratio,
   power drive means for simultaneously rotating said feed wheel device and said spoke wheel device in synchronized relationship,
   and stripper and discharge means disposed adjacent and in association with said spoke wheel device for selectively removing fasteners from said spoke members and for discharging them into separated collections according to the dimensional state or the condition of their bores,
   said stripper and discharge means comprising
       a first inner support wall fixedly secured to said framing structure and having outwardly laterally projecting stripper elements disposed substantially in vertical arrangement one above the other and secured to and extending from said first support wall to a line adjacent said spoke members,
       and a second outer support wall secured to said first support wall and having inwardly laterally projecting stripper elements disposed substantially in vertical arrangement one above the other and secured and extending from said second support wall to a line adjacent said spoke members,
           the said stripper elements of said first and second support walls being arranged respectively in opposed alignment with each other on each side of said spoke members.

2. The machine combination defined in claim 1, and wherein said feed wheel device rotates in a vertical plane, and said slots are disposed in the outer peripheral edge of said device,
   said fasteners being carried in said slots from an upper receiving position adjacent said supply means to a lower discharge position at said spoke wheel device.

3. The machine combination defined in claim 1, and wherein said feed wheel device comprises
   a feed wheel having a bore adapted to receive and be secured to a drive shaft,
   a plurality of lugs extending radially outwardly of said feed wheel from its periphery in spaced-apart relationship to form said spaced slots in the outer peripheral edge of said feed wheel,
   and a substantially semicircular fastener retaining member having a web section closely overlying said feed wheel and lateral flanges closely adjacent the periphery side edges of said feed wheel and about said lugs,
   said retaining member extending from a point adjacent said fastener supply means to a point adjacent said spoke wheel device.

4. The machine defined in claim 3, and wherein said lugs partition said slots in substantially equal peripheral increments.

5. The machine combination defined in claim 1, and wherein said spoke wheel device comprises
   a hub adapted to be secured to a drive shaft, and a plurality of said spoke members secured to said hub, and disposed in a plane radially outwardly of said hub.

6. The machine combination defined in claim 1, wherein said spoke wheel device rotates in a vertical plane, and said spoke members are adapted to impale said fasteners discharged from said feed wheel device.

7. The machine combination defined in claim 5, and wherein each of said spoke members is provided with a plurality of stepdown diameters, from smaller to larger, whereby to removably receive, support and translate a fastener on one of said diameters in a circle of revolution according to the dimensional state of its bore.

8. The machine combination defined in claim 7, and wherein said spoke members are substantially identical in structure so as to define zones of revolution corresponding to the several diameters provided in said spoke members.

9. The machine combination defined in claim 7, and wherein each of said spoke members has
   a first diameter at its distal end adapted to receive and support a female nut fastener having an undersize or low tolerance limit bore condition,
   a second diameter next therebelow adapted to receive and support a female nut fastener having a dimensional bore condition meeting predetermined within tolerance specifications, and a third diameter next therebelow adapted to receive and support a female nut fastener having an oversize or high tolerance limit bore condition.

10. The machine combination defined in claim 8, and wherein each aligned pair of said stripper elements is disposed in engaging and removal relationship with said fasteners from said spoke members at a different elevation corresponding to the zones of revolution of said spoke members.

11. The machine combination defined in claim 1, and wherein said fastener supply means, said feed wheel device, said spoke wheel device, and said stripper and discharge means for selectively removing fasteners from said spoke members are all in vertical alignment.

12. The machine combination defined in claim 1, and wherein said stripper elements are each provided with depending discharge portions also secured to their respective support walls, said discharge portions substantially abutting each other below the circle of revolution of said spoke members.

13. The machine combination defined in claim 12, and wherein said outer support wall with its secured stripper elements and discharge portions is removably secured to said inner support wall, whereby to free said spoke wheel for facile replacement or maintenance.

14. The machine combination defined in claim 1, and wherein said stripper elements affixed to said first inner support wall are each provided with depending discharge portions which extend laterally from said inner to said outer support wall.

15. The machine combination defined in claim 1, and wherein said stripper elements affixed to one of said support walls are each provided with depending discharge portions which extend laterally from said inner to said outer support walls.